United States Patent [19]

Coogler

[11] Patent Number: 4,458,344
[45] Date of Patent: Jul. 3, 1984

[54] TAPERED GEOPHONE SPRING
[75] Inventor: John M. Coogler, Houston, Tex.
[73] Assignee: Geosource Inc., Houston, Tex.
[21] Appl. No.: 477,483
[22] Filed: Mar. 21, 1983
[51] Int. Cl.³ .............................................. H04R 9/00
[52] U.S. Cl. .................................... 367/183; 267/161; 367/187
[58] Field of Search ................ 367/183, 187; 267/158, 267/161

[56] References Cited
U.S. PATENT DOCUMENTS
2,348,225  5/1944  Petty .
2,751,573  6/1956  Millington .
2,753,176  7/1956  List .
3,020,767  2/1962  Kistler .
3,602,490  8/1971  Mueller .
3,738,445  6/1973  Wilson .
3,994,483  11/1976 Perucchi et al. .
4,323,994  4/1982  Coogler .

Primary Examiner—Theodore M. Blum
Attorney, Agent, or Firm—Arnold, White & Durkee

[57] ABSTRACT

A geophone spring is disclosed in which an inner ring member and an outer ring member are connected by a plurality of leg members. Each leg member includes a tapered segment that is wider at its middle than it is at either end. The tapered segment is connected to the inner ring by an inner segment, and to the outer ring by an outer segment. The inner and outer segments may also be tapered.

8 Claims, 4 Drawing Figures

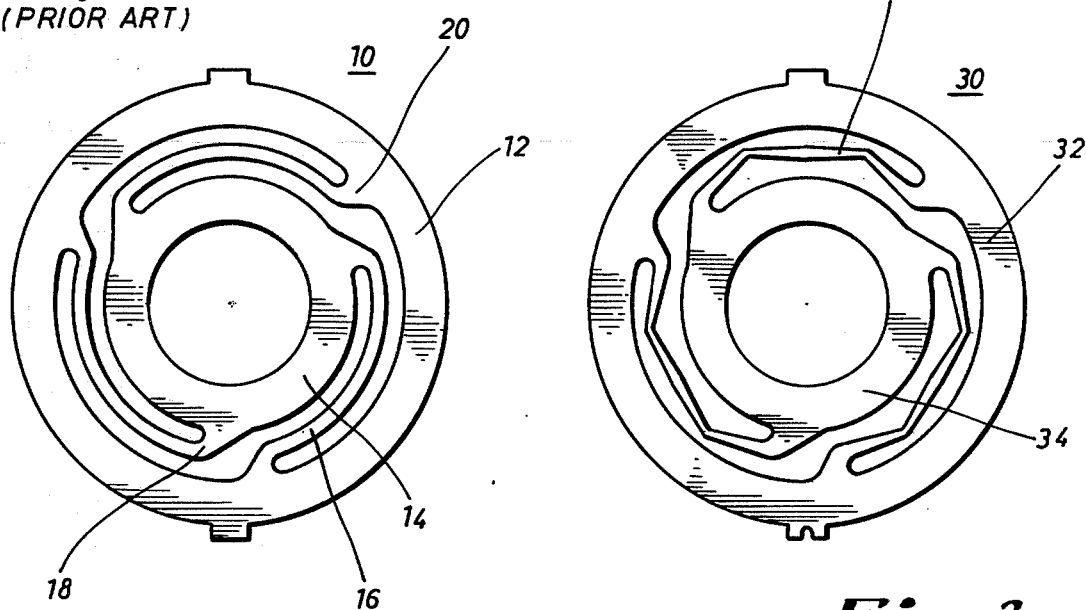
Fig. 1 (PRIOR ART)
Fig. 2
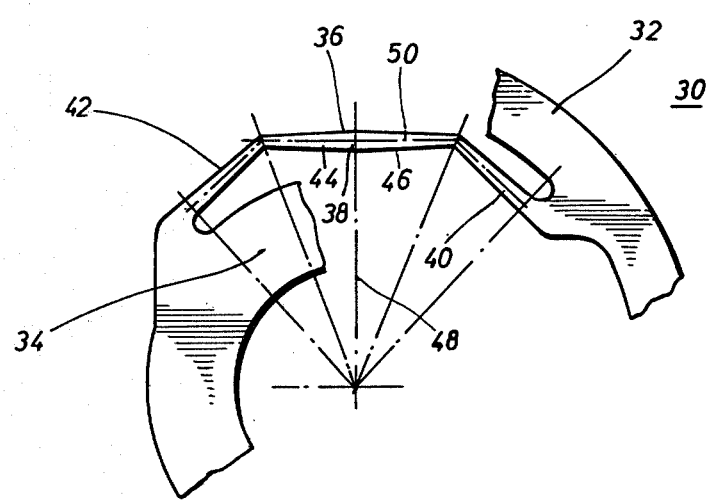
Fig. 3
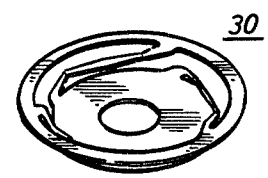
Fig. 4

TAPERED GEOPHONE SPRING

BACKGROUND OF THE INVENTION

This invention relates generally to geophones, and more particularly to suspension springs for geophones or seismometers.

Geophones are devices which sense motion by suspending an inertial mass structure from a rigid, fixed reference supporting structure. Typically, the mass is a coil suspended by springs in a magnetic field, one spring being attached at each end of the coil. The springs position the coil within the magnetic field and form a suspension system having a pre-determined resonant frequency.

In present day geophones, spider springs are used having an inner ring and an outer ring which are connected by a plurality of spokes or legs. Generally three such legs are used, and the three-leg arrangement is generally considered the most stable.

The geophone is intended to sense movement from only one direction. Therefore, it is desirable to eliminate or minimize the effects of any motion from a direction not parallel to the axis of movement of the suspended coil within the geophone. The typical spring suspension system, however, produces a component of vibration along the axis of movement of the suspended coil when the geophone is moved laterally. This produces an undesired or false signal which is commonly referred to in the art as "spurious resonance".

Inasmuch as the geometry and the mass (coil) for a given model of geophone are constant within manufacturing limits, the spurious resonance is also constant. The frequency of the spurious resonance can therefore be raised or lowered by changing the geometry of the suspension springs. This characteristic has been used to segregate or eliminate false signals which are generated by lateral movement of the geophone. Typically, the problem is handled by raising the frequency of the spurious resonance to a level well above the frequency spectrum of interest for the geophone. The present state of the art normally requires a ratio of about 30 to 1 of the spurious resonance to the natural frequency of the geophone.

A common method of achieving the desired ratio of spurious resonance to natural frequency is to shorten the spring legs, thereby raising the frequency of the spurious resonance. This method, while effective, has undesirable side effects.

The legs of known prior art geophone springs have a rectangular cross-section and are curved along their lengths between the junctures with the inner and outer rings of the spring. The spring is "pre-formed", that is, the inner ring is offset or displaced relative to the outer ring, such that when the mass is suspended between two such springs, the inner ring, legs, and outer ring of each spring lie in the same plane. Such pre-forming causes stresses to occur within the spring legs. If the stresses are not uniformly distributed throughout the spring legs, portions of the legs will reach the yield point of the material before other portions with the consequence that the spring legs will become distorted. Such distortions can cause the spring to function in a non-linear manner, thereby producing a distorted signal from the geophone.

The signal distortion caused by spring non-linearity is increased when the legs are relatively short and the pre-forming large, precisely the structure found in low frequency geophones with high spurious resonance. The present invention helps eliminate such signal distortion and spring non-linearity.

SUMMARY OF THE INVENTION

According to the present invention, spring structure is provided which minimizes both signal distortion and spring non-linearity. The spring of the present invention is used in geophones to suspend inertial mass structures from a fixed reference rigid support structure. Seismic oscillations acting upon the geophone will cause the spring suspended mass to move, thus producing an electrical signal indicative of the seismic oscillations.

A geophone spring according to the present invention has an outer ring member, and an inner ring member, and a plurality of leg members connecting the inner and outer ring members. Each leg member has a rectangular cross-section, and includes a tapered segment connected at one end to the outer ring member and at the other end to the inner ring member.

According to one embodiment of the present invention, the tapered segment is wider at its middle than it is at either of its ends. The tapered portion may be substantially straight, with the taper symmetrically disposed about a centerline.

According to another aspect of the invention, the tapered segment is connected to the inner and outer ring members by inner and outer segments. According to one embodiment of the present invention, the inner and outer segments are substantially straight; according to another embodiment of the present invention, the inner and outer segments are arcuate.

According to one aspect of the invention, a plurality of leg members connect the inner and outer ring members. In one embodiment of the present invention, an odd number of leg members connect the inner and outer ring members; in another embodiment, the inner and outer ring members are connected by three leg members, preferably disposed equidistant from each other.

BRIEF DESCRIPTION OF THE DRAWINGS

The invention will further be described by reference to the accompanying drawings which illustrate particular embodiments of geophone springs in accordance with the present invention, wherein like members bear like reference numerals and wherein:

FIG. 1 is a planar view of a typical prior art geophone spring;

FIG. 2 is a planar view of a geophone spring according to the present invention;

FIG. 3 is an enlarged planar view of a portion of the geophone spring illustrated in FIG. 2; and FIG. 4 is a perspective view of a geophone spring according to the present invention in a pre-formed state.

DESCRIPTION OF THE PREFERRED EMBODIMENTS

The present invention is an improvement upon the geophone spring structure disclosed in may earlier patent application, now U.S. Pat. No. 4,323,994. My earlier patent, which issued on Apr. 6, 1982, is hereby incorporated by reference.

Referring now to the drawings, and in particular to FIG. 1, there is shown in planar view, a prior art geophone spring 10. The spring 10 includes an outer ring member 12 connected to an inner ring member 14 by three leg members 16. The leg members 16 are each curved about the center of the spring 10, and extend from a juncture point 18 on the inner ring member 14 to a juncture point 20 on the outer ring member 12.

When each of the curved leg members 16 are subjected to a force, the inner fiber of each leg member (that is, the portion of each leg member 16 disposed closest to the inner ring member 14) and the outer fiber of each leg member 16 (that is, the portion of each leg member 16 disposed closest to the outer ring member 12) are stressed differently as will be apparent to those skilled in the art.

Each curved leg member 16 is subject to the action of equal and opposite couples about the neutral axis of the leg member. Inasmuch as the neutral axis of each curved leg member 16 will not be coincidental with the gravity axis, but will lie between the gravity axis and the inside radius of the leg member 16, the force acting on the inner fiber of each leg member 16 will have a magnitude greater than the force acting on the outer fiber. Consequently, the inner fiber of each curved leg member 16 is stressed more than the outer fiber. See Alfred P. Poorman, *Strength of Materials* (1945), pages 295–297.

The result of this unequal stressing in the curved leg members 16 is that the inner fibers may reach the yield point of the spring material before the outer fibers, with the consequence that the inner fibers will be stretched or distorted out of shape. This is of particular concern when the spring legs have been shortened to increase the frequency of the spurious resonance. Such stretching or distortion of the leg members may cause the spring to become nonlinear and to cause the geophone to generate a distorted signal.

The ill effects of the leg members 16 being curved can be improved by making at least a portion of the leg members straight as disclosed in my earlier patent, U.S. Pat. No. 4,323,994. When a beam of rectangular cross-section of uniform width is deflected, however, the stress is not uniform in the outer fibers at all points along the leg member. Therefore, during the pre-forming process, the leg members are still subjected to unequal stresses which result in some stretching or distortion.

The geophone spring illustrated in FIGS. 2, 3 and 4 minimize such stretching or distortion. Referring now to FIG. 2, a geophone spring 30 according to the present invention includes an outer ring member 32 connected to an inner ring member 34 by a plurality of leg members 36. According to the present invention, an odd number of leg members are preferred, and three leg members are most preferred.

The leg members 36 are each essentially a beam. In general, a beam of constant strength is one in which the unit flexural stress in the outer fibers is the same in all sections. If S is the unit flexural stress, M the moment produced by a load at a given distance along the beam from its end, I the moment of inertia of a cross-section of the beam, and c the distance from the controidal axis to the outer fiber, then since M/S=I/c, the section modulus I/c must vary as the moment M if S is to remain constant. Since the moment in a beam varies with its length, then the section modulus must also vary with length.

If the depth of the beam is to remain constant, the width must then be varied according to the expression $b = (6Px)/(Sd^2)$ where b is the width, P the applied load, x the distance along the beam at which the load is applied, and d the depth of the beam. In a cantilever beam, the result is a beam which tapers from the fixed end to the free end. See generally, Alfred P. Poorman, *Strength of Materials* (1945), at pages 202–203.

Referring to FIGS. 2 and 3, and in particular to FIG. 3, each leg member 36 includes a tapered segment 38 connected at one end to the outer ring member 32 by an outer segment 40, and connected at the other end to the inner ring member 34 by an inner segment 42. As illustrated, the outer and inner segments 40 and 42 are each substantially straight. In an alternate embodiment (not illustrated) the inner and outer segments 40 and 42 are arcuate.

The tapered segment 38 is wider at its center than at either of its ends. The tapered segment 38 includes two tapered portions 44 and 46 symmetrically disposed about a centerline 48. The tapered segment 38 is further symmetrically disposed about a centerline 50.

The tapered portions 44 and 46 are connected to each other at their widest portion. This structure places the greatest mass of material in the vicinity of the centerline 48, which is the portion of the leg member 36 that experiences the greatest moment. Similarly, the outer and inner segments 40 and 42 are tapered such that their narrower ends are connected to the ends of the tapered segment 38, and their wider ends are connected to the outer and inner ring members 32 and 34, respectively. By this arrangement, more material is provided at points of greatest moment and less material is provided at points of least moment, thereby equalizing the unit flexural stress throughout the leg member 36.

Referring now to FIG. 4, the geophone spring according to the present invention is illustrated in its preformed state. Geophone springs according to the present invention may be formed from spring material such as beryllium copper alloy by any suitable process, for example, by stamping out the spring configuration, by taking thin discs of an appropriate material and etching slots between the legs and rings, and so forth. Appropriate structure may be included for attaching the spring to the geophone.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. A geophone spring for suspending an inertial mass structure from a rigid support structure, said geophone spring comprising:
   an outer member;
   an inner member; and
   a plurality of leg members connecting said outer and inner members, each of said leg members including
      a substantially straight tapered segment;
      an outer segment connecting the tapered segment to the outer member; and
      an inner segment connecting the tapered segment to the inner member.

2. The geophone spring according to claim 1 wherein said tapered segment comprises:
   a first tapered portion having first and second ends, said first end being narrower than said second end and said first end being connected to said outer segment; and
   a second tapered portion having first and second ends, said first end being narrower than said second end, said first end being connected to said inner segment, and said second end being connected to the second end of said first tapered portion.

3. The geophone spring according to claim 2 wherein said inner and outer segments each comprise tapered segments.

4. The geophone spring according to claim 1 wherein said outer segment and said inner segment are each substantially straight.

5. The geophone spring according to claim 1 wherein said inner and outer segments are each arcuate.

6. The geophone spring according to claim 1 wherein said plurality of leg members includes three leg members.

7. The geophone spring according to claim 1 wherein said leg members are shortened to achieve a ratio of substantially 30 to 1 for the spurious resonance of the spring to the natural frequency of the spring.

8. A geophone spring for suspending an inertia mass structure from a rigid support structure, said geophone spring comprising:
an outer member;
an inner member;
an odd number of leg members connecting said outer and inner members, each of said leg members including:
a substantially straight tapered segment having two ends and a central portion disposed between said ends, said tapered segment being wider at said central portion than at either of said ends;
a tapered outer segment connecting one of the ends of the tapered portion to said outer member; and
a tapered inner segment connecting the other of the ends of the tapered portion to said inner member.

* * * * *